(12) United States Patent
Chen et al.

(10) Patent No.: US 6,360,364 B1
(45) Date of Patent: Mar. 19, 2002

(54) SYSTEM AND METHOD FOR INSTALLING AN APPLICATION ON A PORTABLE COMPUTER

(75) Inventors: James S. L. Chen; Stephen D. Flanagin; George T. Hu, all of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/271,929

(22) Filed: Mar. 17, 1999

(51) Int. Cl.[7] .............................................. G06F 9/445
(52) U.S. Cl. ......................................... 717/11; 711/171
(58) Field of Search ............................ 717/11; 709/221, 709/222, 217, 327, 321; 710/8, 13, 14, 73, 74; 711/171–173, 170; 713/1, 2

(56) References Cited

U.S. PATENT DOCUMENTS

| | | | | | |
|---|---|---|---|---|---|
| 5,247,683 A | * | 9/1993 | Holmes et al. | ............. | 709/221 |
| 5,408,624 A | * | 4/1995 | Raasach et al. | ............... | 717/11 |
| 5,412,798 A | * | 5/1995 | Garney | ....................... | 709/321 |
| 5,579,529 A | * | 11/1996 | Terrell et al. | .................. | 710/8 |
| 5,600,840 A | * | 2/1997 | Pearce et al. | ............... | 713/323 |
| 5,706,407 A | * | 1/1998 | Nakamura et al. | .......... | 700/250 |
| 5,768,568 A | * | 6/1998 | Inui et al. | ..................... | 710/16 |
| 5,822,600 A | * | 10/1998 | Hallowell et al. | .......... | 713/340 |
| 5,835,759 A | * | 11/1998 | Moore et al. | .................. | 713/1 |
| 5,860,125 A | * | 1/1999 | Reents | ....................... | 713/320 |
| 5,867,714 A | * | 2/1999 | Todd et al. | .................... | 717/11 |
| 5,920,728 A | * | 7/1999 | Hallowell et al. | .......... | 713/323 |
| 5,935,228 A | * | 8/1999 | Shinomura | .................. | 710/102 |
| 5,951,684 A | * | 9/1999 | Jeon | .............................. | 713/1 |
| 6,009,480 A | * | 12/1999 | Pleso | ............................ | 710/8 |
| 6,078,921 A | * | 6/2000 | Kelley | ......................... | 707/10 |

* cited by examiner

Primary Examiner—Tuan Q. Dam
(74) Attorney, Agent, or Firm—Lee & Hayes, PLLC (57) ABSTRACT

A base computer installs an application program to a portable computer by determining a size associated with the application being installed. The portable computer contains a built-in memory used for both program execution and data storage. Additionally, one or more memory expansion cards may be coupled to the portable computer. The base computer determines the storage space available in the built-in memory in the portable computer. If the storage space available in the built-in memory of the portable computer can accommodate the application, then the base computer installs the application to the built-in memory. If the storage space available in the built-in memory of the portable computer cannot accommodate the application, then the base computer determines whether a memory expansion card is coupled to the portable computer. If a memory expansion card is coupled to the portable computer, then the base computer installs the application to the memory expansion card. If multiple memory expansion cards are coupled to the portable computer, the base computer generates a list of all storage devices and requests that the user select the storage device for installing the application.

33 Claims, 7 Drawing Sheets

SYSTEM AND METHOD FOR INSTALLING AN APPLICATION ON A PORTABLE COMPUTER

TECHNICAL FIELD

This invention relates to the installation of applications from base computer (such as a desktop computer) to a portable peripheral computer (such as a handheld computer). More particularly, the invention relates to the installation of applications from a base computer to one or more optional memory expansion cards of a portable peripheral computer.

BACKGROUND OF THE INVENTION

Laptop, handheld, and other portable computers or computing devices have increased in popularity as the devices have become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on read-only memory (ROM)). Alternatively, the application programs may be installed by the user after purchasing the portable computer.

Many of these small computers have limited physical resources. For example, both primary and secondary memory are typically quite limited in comparison to desktop computers. In addition, small computers and other information processing devices often do not accommodate any form of removable mass storage such as floppy disks or optical disks. To make up for this deficiency, such computers are often capable of utilizing the resources of desktop computers or other base computers.

The invention described herein relates to the ability of portable computers such as laptops, handhelds, and palmtops to be programmed in conjunction with a more capable base computer such as a desktop computer. Specifically, the invention relates to the use of a base computer to install programs on a smaller, more resource-limited portable computer. Such programs are typically distributed from their manufacturers on some type of non-volatile storage medium such as a floppy disk or a CD-ROM. Since the portable computer has no hardware to read such a storage medium, the portable computer is instead connected to communicate with a base computer, typically through a serial link. The base computer reads the application program from the non-volatile storage medium and downloads the program to the portable computer.

Portable computers that can receive application programs downloaded from a desktop computer are versatile and allow application programs to be replaced or upgraded easily. Typically, an installation application is run on the desktop computer that allows the user to select one or more application programs for downloading into the portable computer. After selecting the appropriate application programs, the installation application downloads the application programs to the portable computer.

In the environment of "Microsoft Windows CE" operating systems, application programs are often distributed in the form of "CE Cabinet Files" or "CE CAB files." "CE CAB files" may also be referred to as "installation files" or "setup package files." Throughout this specification, the term "CAB files" shall be understood to mean "CE CAB files."

A CAB file typically includes all of the files of an application program, as well as other setup information such as registry settings. Thus, the CAB file contains all information, files, and other components necessary to install the corresponding application on a computer. To install the application program, the various components of the CAB file are extracted from the CAB file and written separately to the memory of the computer. Other information contained in the CAB file is also extracted from the CAB file and recorded as appropriate. For example, registry information is copied to the computer's registry.

When installing a program to a portable computer from a base computer, the base computer typically runs an installation program that copies the corresponding CAB file into the memory of the portable computer. Once the CAB file is in memory, a load module in the portable computer then dissects the CAB file and copies its components separately into the computer's memory. The CAB file components are deleted from the CAB file as they are copied individually to memory, thereby minimizing ongoing memory requirements.

Some portable computers contain a built-in main memory as well as one or more slots or connectors to receive optional memory expansion units or cards. Such expansion cards allow a user to increase the memory resources of a portable computer. Such additional memory resources can be used for storing additional application programs, storing additional data, or executing additional application programs simultaneously.

In many portable computers, the load module is capable of querying its various memory components, including any installed memory expansion cards, to determine and display any available memory locations where an application program might be installed. Such a computer typically presents the user with some sort of visual interface indicating the memory structure of the computer, allowing the user to select an identified memory component as the installed location of a program. In the "Windows CE" operating environment, different memory devices and locations may be represented as different directories or "folders" in a graphical display.

In other portable computers, however, this functionality does not exist. Specifically, the operating systems of such computers do not have user interface components that allow a user to "browse" among the different memory components of the device and to then select one of the memory components to receive an application program. In these computers, an application program is usually installed from a CAB file to the same memory component occupied by the CAB file, without any opportunity for user intervention. An alternative is to request that the user type in a memory specification (or memory location), without the benefit of the more convenient and intuitive graphical interface. This requires a degree of user sophistication that cannot usually be assumed, however, and is therefore very prone to mistakes. A mistake in specifying the memory location results in an aborted installation.

Rather than request a typed memory specification from a user, systems such as this typically install an application program in the same memory location or device as occupied by the CAB file. When copying the CAB file from the base computer, the CAB file is typically copied to a default memory device or location in the portable computer. This default location is usually in the built-in memory of the portable computer. After the CAB file is written to the portable computer's built-in memory by the base computer, certain portable computers allow the CAB files to be manually copied or moved by a user into the memory of a different memory device such as the memory of a memory expansion card. This results in the application being installed by the load component into the memory of the expansion card (into the same memory as occupied by the CAB file). However, portable computers that do not have a file browser cannot move or copy the CAB files from the portable computer's default memory device. With these devices, the CAB files (and the installed application) remain in the portable computer's default memory device.

This installation method is very inconvenient and difficult for many users. In addition, it requires that the built-in memory have enough available capacity to accommodate the entire CAB file. Since CAB files are typically uncompressed, this means that there must be enough built-in memory to accommodate the entire application program, even though the application program is eventually to be installed in memory other than the built-in memory. If the built-in memory space available in the portable computer is insufficient to receive the application program, then the installation will fail regardless of whether there is an installed memory expansion card with sufficient memory to receive the application program. In this situation, the user must either delete one or more application programs from built-in memory or move one or more application programs from built-in memory to an expansion card to free up built-in memory. This process of deleting or moving application programs to increase space available in built-in memory is cumbersome and often requires the reinstallation of deleted application programs after installing and moving other applications to expansion cards.

The invention described below addresses these disadvantages by allowing a user to install application programs from a desktop computer directly to a memory expansion card in the portable computer, whether or not there is enough available built-in memory to accommodate the application program in the portable computer.

SUMMARY OF THE INVENTION

The invention allows installation of an application program from a base computer directly to a memory expansion card of a portable peripheral computer. The installation process is controlled by an installation program that runs on the base computer and that communicates with the portable computer by means of a serial link or other form of data communications. The installation program on the base computer interacts with the portable computer and with a user to determine an appropriate location for installing the application program on the portable computer. Thus, intelligent decisions can be made regarding program installation, even though the portable computer itself does not have a graphical interface for selecting memory locations.

The direct installation of the application program to the memory expansion card does not require any use of the built-in memory of the portable computer. Thus, a user can install a new application program to a portable computer without disturbing any of the existing programs or data stored in built-in memory, even if built-in memory is full. Additionally, the invention allows the direct installation of the application program to a memory expansion card in a portable computer that does not include a file browser to identify memory expansion cards (which can be represented as files) in the portable computer.

When an application is selected for installation to a portable computer, an installation program on the base computer determines the size of the selected application. The base computer then determines the storage space available in the built-in memory of the portable computer. If the built-in memory can accommodate the application, then the base computer installs the application to the portable computer's built-in memory. If the built-in memory cannot accommodate the application, then the base computer determines whether a memory expansion card is installed in the portable computer. If at least one memory expansion card is installed, the base computer attempts to install the application in one of the memory expansion cards. If the first attempt to install the application to a memory expansion card fails (e.g., not enough memory available), then the base computer attempts to install the application to another memory expansion card, if available. If all attempts to install the application to a memory expansion card fail, then the base computer generates a message indicating an unsuccessful installation.

In another implementation of the invention, the base computer identifies all storage locations (i.e., built-in memory and all memory expansion cards) that are capable of receiving the application. The base computer then generates a list of all identified storage locations and asks the user to select the desired storage location for installation. Additionally, the base computer may display the space required to install the application and the space available at each storage location on the list.

Another aspect of the invention considers the size of the application being installed. If the application size exceeds a threshold value, then the base computer first attempts to install the application to a memory expansion card instead of built-in memory. This prevents large applications from using a substantial portion of built-in memory if sufficient space is available on a memory expansion card.

DETAILED DESCRIPTION

Figure 1:
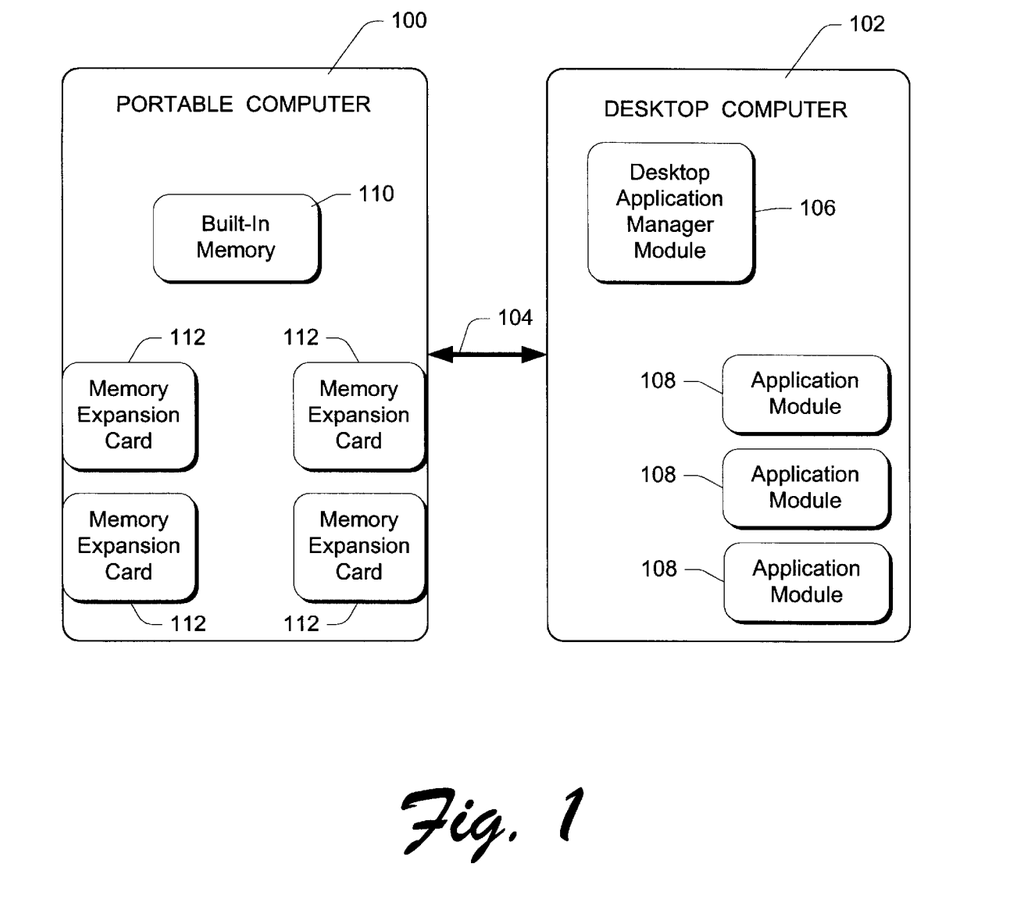
FIG. 1 illustrates an exemplary portable computer and an exemplary base computer in accordance with the invention.

FIG. 1 illustrates an exemplary portable computer 100 and an exemplary desktop computer 102 in accordance with the invention. Portable computer 100 may also be referred to as a "portable peripheral computer." Desktop computer 102 is referred to herein as a "base computer." Portable computer 100 can be any type of laptop, palmtop, handheld, or other computing device capable of receiving application programs from a base computer such as desktop computer 102. Portable computer 100 includes a limited amount of built-in memory 110 as well as one or more optional memory expansion cards 112. Memory expansion cards 112 may also be referred to as "storage cards" or "memory expansion units." A portion of built-in memory 110 is addressable memory for program execution, and the remaining portion is used to simulate secondary disk storage. The memory expansion cards may contain permanently installed applications, such as applications stored in a read-only memory (ROM), not shown. Additionally, a memory expansion card 112 may contain non-volatile memory for storing data or downloaded application programs, thereby supplementing built-in memory 110. Memory expansion cards 112 allow the user of portable computer 100 to customize the device by adding permanently installed application programs or adding memory for storing additional data and downloading additional application programs.

Portable computer 100 is designed to take advantage of a base computer's hardware resources. Particularly, portable computer 100 is designed so that application programs and other data can be read from a distribution medium by base computer 102, and then downloaded to portable computer 100. Portable computer 100 is thus referred to as a peripheral computer, in that it is controlled during this process by base computer 102.

To allow communications between base computer 102 and portable computer 100, they are coupled to one another through a communication link 104. Typically, communication link 104 is a temporary bidirectional communication link established to exchange data between portable computer 100 and base computer 102. Communication link 104 is used, for example, to download one or more application programs from base computer 102 to portable computer 100. In a particular embodiment, communication link 104 is a serial communication link. However, communication link 104 can utilize any type of communication medium and any type of communication protocol to exchange data between portable computer 100 and base computer 102.

Base computer 102 in the described embodiment is a conventional personal desktop computer. However, other types of computers might be used in this role. Base computer 102 includes a desktop application manager program or module 106 and multiple application programs or modules 108. Application modules 108 include application programs that can be executed by portable computer 100. Application modules 108 may include word processing applications, spreadsheet applications, contact manager applications, and game applications. Desktop application manager module 106 is an application program executed by base computer 102, which allows the user to select one or more application modules 108 for installation on portable computer 100. As discussed in greater detail below, desktop application manager module 106 also allows the user to select whether a particular application module 108 is installed to built-in memory 110 or to a memory expansion card 112 in portable computer 100.

Figure 2:
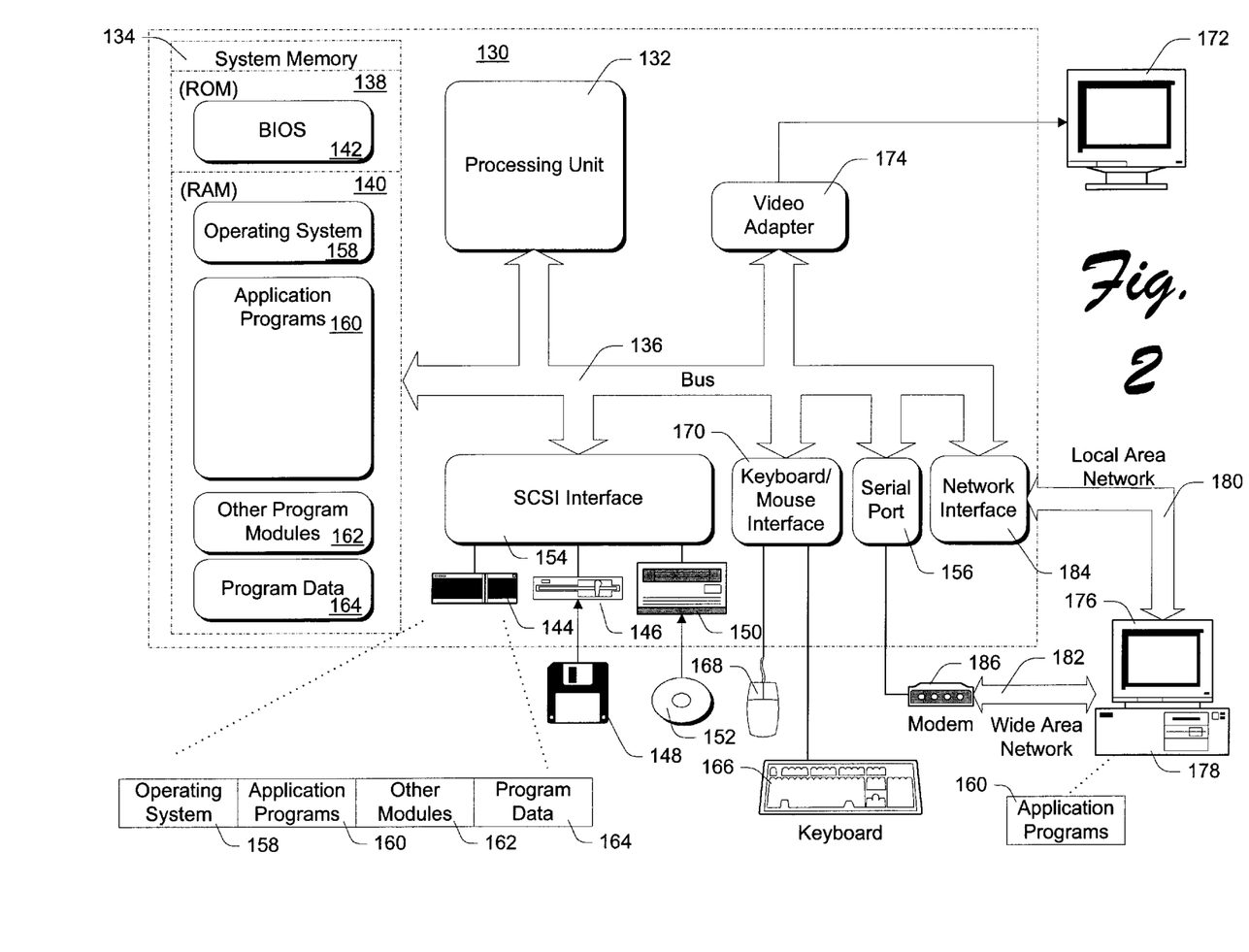
FIG. 2 is a block diagram showing pertinent components of a computer in accordance with the invention.

FIG. 2 shows a general example of a desktop computer 102 that can be used in accordance with the invention. Computer 102 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 102, such as during start-up, is stored in ROM 138.

Computer 102 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 102. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 102 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 102 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 102, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs.

From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
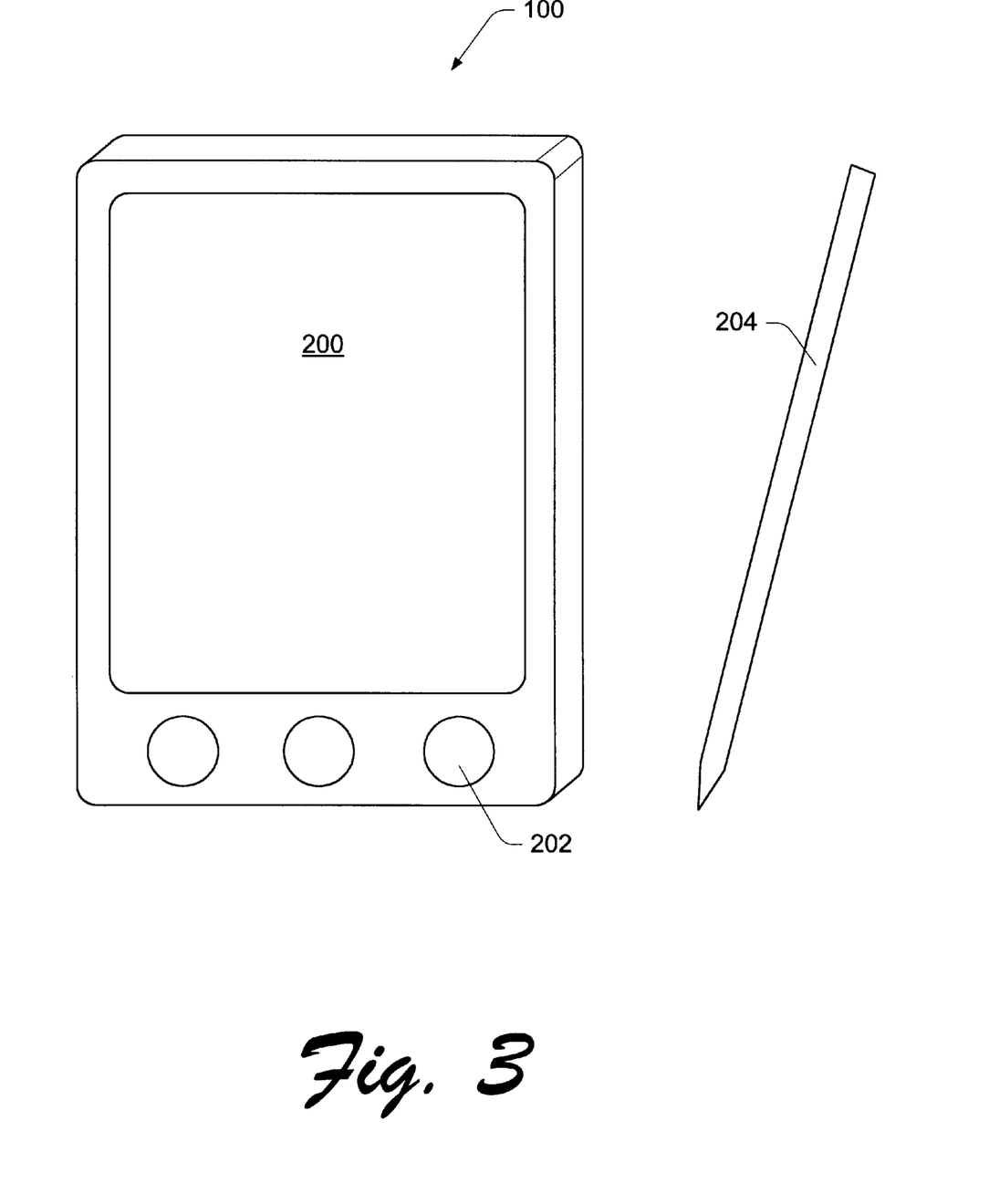
FIG. 3 illustrates an embodiment of a portable computer in accordance with the present invention.

FIG. 3 shows an embodiment of portable peripheral computer 100 for use with the present invention. For purposes of this description, the term "portable" is used to indicate a small computing device having a processing unit that is capable of running one or more application programs, a display, and an input mechanism that is typically something other than a fall-size keyboard. The input mechanism might be a keypad, a touch-sensitive screen, a track ball, a touch-sensitive pad, a miniaturized QWERTY keyboard, or the like. In other implementations, the portable computer may be implemented as a personal digital assistant (PDA), a personal organizer, a palmtop (or handheld) computer, a computerized notepad, or the like. The term "peripheral" is used to indicate that the computer can be connected to operate under the control of or to respond to instructions from a base computer.

Portable computer 100 includes an LCD display 200 and several user input keys or buttons 202. The LCD display 200 is a touch-sensitive screen which, when used in conjunction with a stylus 204, allows a user to input information to portable computer 100. The stylus 204 is used to press the display at designated coordinates for user input. Buttons 202 provide another mechanism for user input. A particular portable computer may have any number of buttons for user input. Although not shown in FIG. 3, portable computer 100 also includes one or more slots or other receptacles capable of receiving memory expansion cards.

Figure 4:
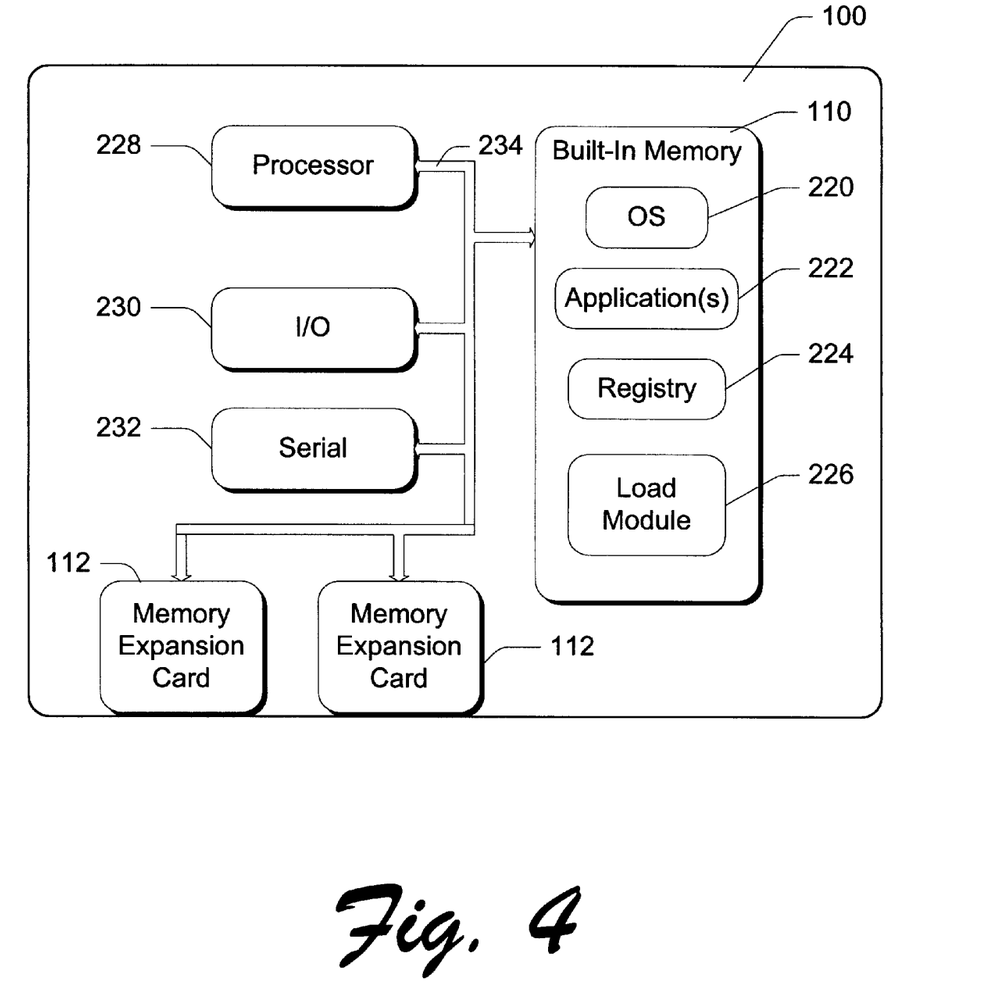
FIG. 4 is a block diagram illustrating pertinent components of a portable computer in accordance with the invention.

FIG. 4 is a block diagram illustrating pertinent components of the portable Computer 100. Portable computer 100 includes built-in memory 110 and one or more memory expansion cards 112. Built-in memory 110 includes an operating system 220, one or more application programs 222, a registry 224, and a load module 226. Additionally, portable computer 100 has a processor 228, I/O components 230 (including the display 200 and buttons 202 in FIG. 3), and a serial interface 232 for communicating with other computing devices (such as desktop computer 102 or another portable computer 100). In one embodiment, the various components in portable computer 100 communicate with one another over a bus 234. In one embodiment of portable computer 100, built-in memory 110 is a non-volatile electronic memory such as a random access memory (RAM) with a battery back-up module, not shown. In an alternate embodiment, built-in memory 110 is implemented using a flash memory device. Part of this built-in memory 110 is addressable memory for program execution, and the remaining part is used to simulate secondary disk storage.

Operating system 220 executes on processor 228 from built-in memory 110. In a particular embodiment of the invention, portable computer 100 runs the "Windows CE" operating system manufactured and distributed by Microsoft Corporation of Redmond, Wash. This operating system is particularly designed for small computing devices.

Application programs 222 execute from built-in memory 110 of portable computer 100. The number of application programs 222 that can be simultaneously installed on portable computer 100 is a function of the portion of built-in memory allocated to store application programs and the size of the application programs 222 currently installed. In addition, application programs can be installed on memory expansion cards 112 as described below.

The registry 224 is a database that is implemented in various forms under different versions of the "Windows" operating systems. The registry contains information about applications stored on portable computer 100. Exemplary registry information includes user preferences and application configuration information.

Figure 5:
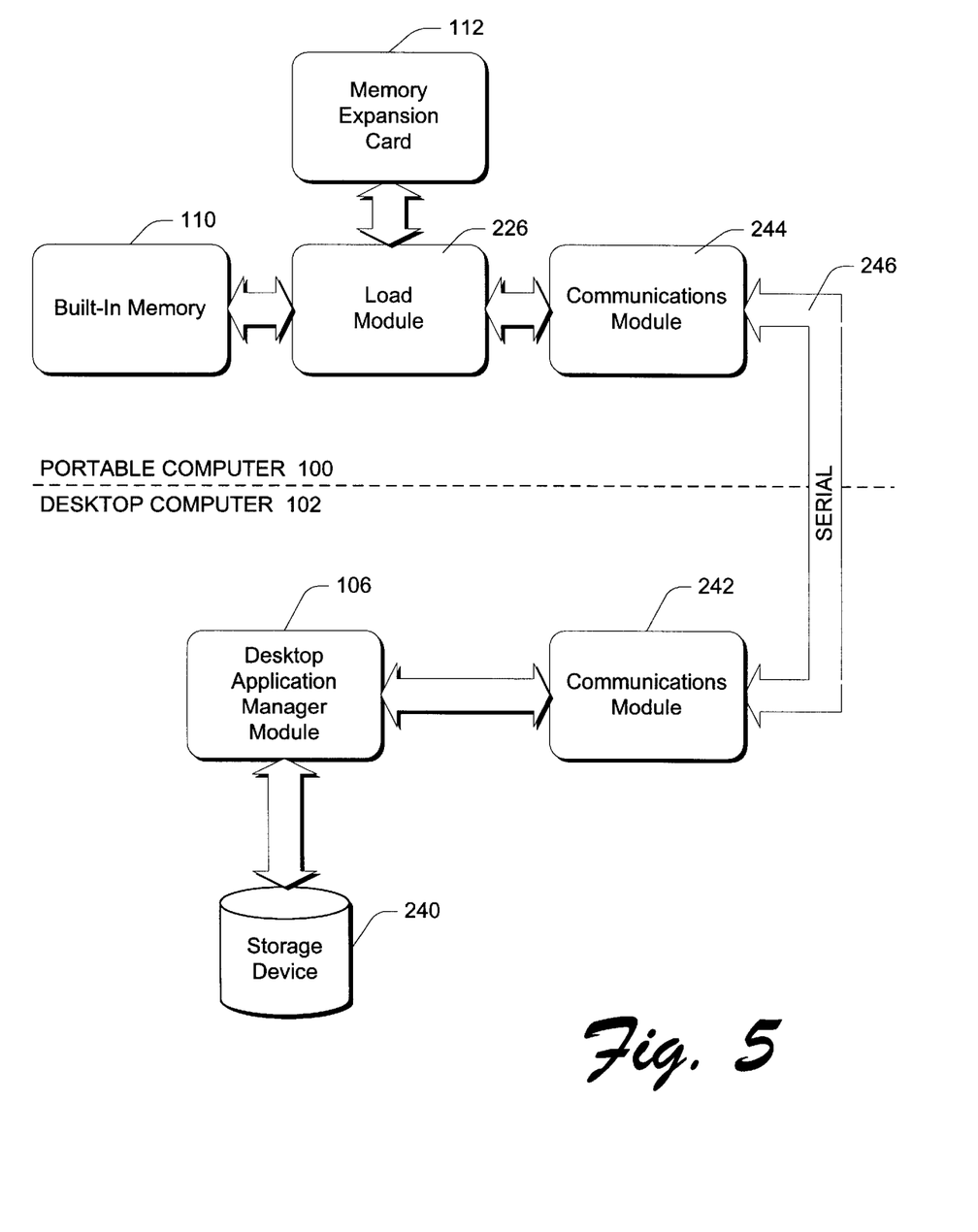
FIG. 5 is an architectural diagram of a system in accordance with the invention for installing an application on a portable computer.

FIG. 5 is an architectural diagram of a system in accordance with the invention for installing an application from desktop computer 102 to portable computer 100. As discussed above, desktop application manager module 106 allows the user to select one or more application programs for installation on portable computer 100. Such applications programs are stored in some type of non-volatile memory 240 that is accessible by desktop application manager 106. In many cases, these applications are stored as CAB files on removable media such as floppy disks or CD-ROMs. In other cases, the applications might be stored on some type of local, non-removable media such as a hard disk, or on a remote storage device accessible through network connections.

Desktop application manager module 106 is designed to present a graphical user interface from which a user may select a particular application (CAB file) for installation to a connected portable computer. In addition, this graphical user interface allows the user to select whether a particular application program is installed to built-in memory 110 or to memory expansion card 112 of the portable computer 100. Once the application program and destination location are selected, desktop application manager module 106 downloads the application program's CAB file to built-in memory 110 or to memory expansion card 112, as selected by the user.

Communications modules 242 and 244 are implemented on desktop computer 102 and portable computer 100, respectively. These communications modules implement serial communications between the desktop computer and the portable computer using a serial connection 246 (e.g., a serial cable or an infrared link). Desktop application manager module 106 communicates with load module 226 and other operating system components of portable computer 100 through these communications components.

As discussed above, application programs are copied to portable computer 102 in the form of CAB files. A CAB file includes all of the files of the application, as well as other setup information such as registry settings. Thus, the CAB file contains all files and components necessary to run the corresponding application on portable computer 100. In one embodiment of the invention, CAB files are stored and transferred to the portable computer 100 in an uncompressed format. By using uncompressed CAB files, the size of the CAB file is approximately equal to the amount of memory required to store the associated application program in the portable computer 100.

Desktop application manager module 106 copies the CAB files into built-in memory 110 or into one of the attached memory expansion cards 112, depending on the selection provided by the user or the result of the installation procedures discussed below. Desktop application manager module 106 also writes the CAB file path (i.e., installation location) to registry 224 (FIG. 4) of the portable computer. Once the CAB files are copied to built-in memory 110 or memory expansion card 112, the load module 226 is invoked to install the CAB file components into built-in memory 110 or into memory expansion card 112, as appropriate. When load module 226 is invoked, it reads registry 224 to determine the location of the CAB file and unpacks the CAB file and installs the application directly to the built-in memory 110 or memory expansion card 112, depending on the location of the CAB file—the application is installed to the same directory occupied by the CAB file. The CAB file components are deleted from the CAB file as they are installed to the built-in memory 110 or memory expansion card 112, thereby minimizing the space required to install the application. If the CAB file components are installed to memory expansion card 112, then the operation of the load module 226 does not require any storage space in built-in memory 110.

Figure 6:
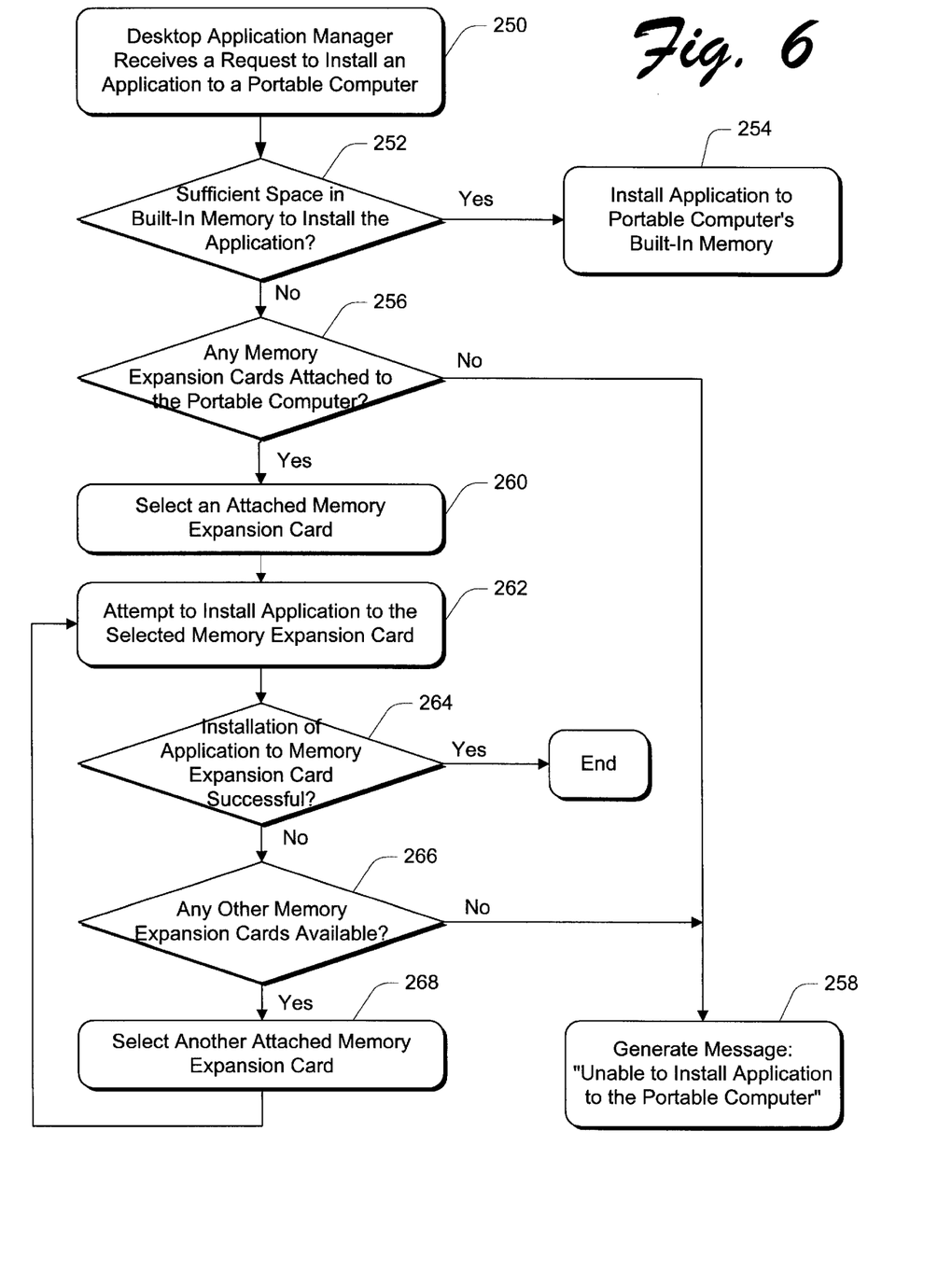
FIG. 6 is a flow diagram illustrating an exemplary procedure for installing an application on a portable computer.

FIG. 6 is a flow diagram illustrating an exemplary procedure for installing an application on a portable computer. This procedure minimizes the decisions required of a user when installing an application to a portable computer. If the built-in memory of the portable computer has sufficient space to receive a selected application, then the application is installed to built-in memory without requiring any additional input from the user. In addition, decisions and user interaction are implemented at the desktop computer, thereby minimize user interface requirements at the portable computer. For example, there is no need to implement a graphical file browser or explorer component on the portable computer.

Typically, multiple application programs are stored on a desktop computer, one or more of which may be CAB files capable of being installed to a portable computer. These CAB files may be installed into the desktop computer from a CD-ROM, diskette, or other media. Alternatively, CAB files can be downloaded from a server or other data source across a network or other communication link. Once the CAB files are installed on the desktop computer, they are available for installation on a portable computer.

At step 250 of FIG. 6, the desktop application manager receives a request from a user to install an application program to a portable computer. The procedure continues to step 252 where the desktop application manager determines whether the built-in memory of the portable computer is sufficient to receive the requested application. To make this determination, the desktop application manager identifies the size of the CAB file associated with the requested application and identifies the storage space available in the built-in memory of the portable computer. Since the CAB file is stored on the desktop computer, the desktop application manager has access to the storage size of the CAB file through conventional operating system calls. To determine the storage space available in the built-in memory of the portable computer, the desktop application manager uses a remote API method that is exposed by the operating system of the portable computer. A remote API method is a method that can be invoked through serial communications link 246 by a base computer such as desktop computer 102. For example, the "CeGetStoreInformation" API is useful to determine the space available in the built-in memory of the portable computer. If built-in memory has sufficient space to receive the application, then the procedure branches to step 254, which installs the application to the portable computer's built-in memory. Step 254 comprises copying the CAB file to the built-in memory and then invoking load module 226. The load module installs the application to the same memory space as occupied by the CAB file, which in this case is the portable computer's built-in memory.

If the built-in memory does not have sufficient space to receive the requested application, then the procedure continues to step 256. At step 256, the desktop application manager determines whether any memory expansion cards are attached to the portable computer. The desktop application manager uses another remote API method to identify attached memory expansion cards. Remote API calls such as "CeFindFirstFile" and "CeFindNextFile" are useful to identify the files or folders in the root directory of the portable computer. A memory expansion card can be identified by the fact that its "FILE_ATTRIBUTE_DIRECTORY" and "FILE_ATTRIBUTE_TEMPORARY" file attribute flags are set. If no memory expansion cards are attached to the portable computer, then the procedure terminates at step 258, where a message is generated indicating that the desktop application manager was unable to install the application to the portable computer At this point, the user can delete one or more programs from built-in memory or install a memory expansion card to receive the requested application, and then initiate the process anew.

If step 256 determines that a memory expansion card is attached to the portable computer, then the procedure continues to step 260, which selects one of the attached memory expansion cards to receive the requested application. The memory expansion card may be selected at random or using any other selection method, such as selecting the memory expansion card with the lowest address. Step 262 attempts to install the application to the selected memory expansion card. If the installation of the application to the memory expansion card is successful at step 264, then the procedure terminates. Otherwise, the procedure continues to step 266 to determine whether any additional memory expansion cards are attached to the portable computer. If no additional memory expansion cards are attached to the portable computer, then the procedure branches to step 258 where the user is notified that the desktop application manager was unable to install the application to the portable computer. If additional memory expansion cards are attached to the portable computer, then step 268 selects another memory expansion card and returns to step 262 where the procedure attempts to install the application to the selected memory expansion card. This process continues until the application is successfully installed on a memory expansion card or the attempted installation on all attached memory expansion cards fails.

Figure 7:
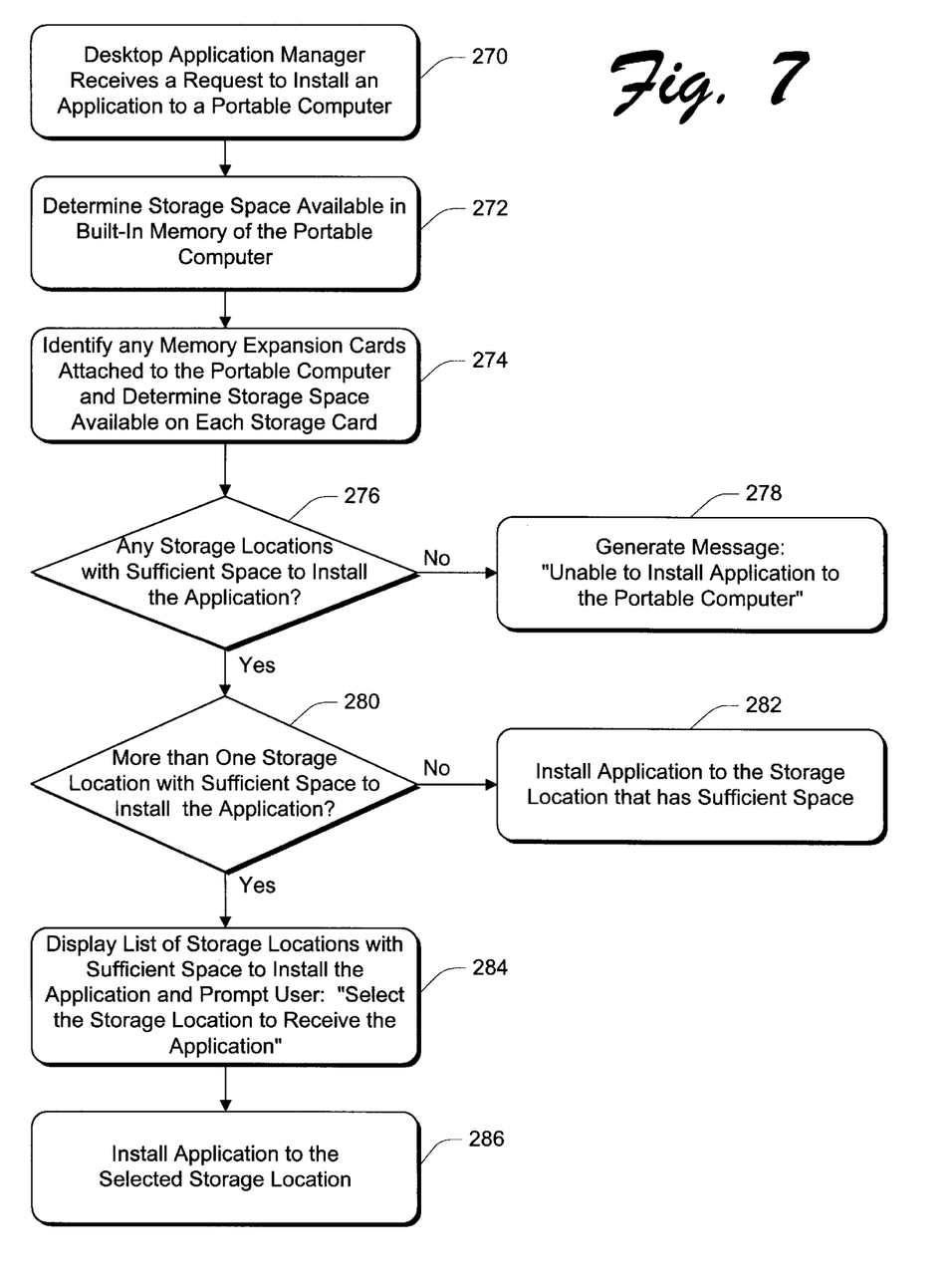
FIG. 7 is a flow diagram illustrating an alternate procedure for installing an application on a portable computer.

FIG. 7 is a flow diagram illustrating an alternate procedure for installing an application on a portable computer. This procedure allows the user to select the installation location in the portable computer, even if there is sufficient space in built-in memory to receive the selected application. Additionally, this procedure determines the space available on each memory expansion card attached to the portable computer to assist the user in selecting an appropriate memory expansion card. Thus, the user has greater control over the installation process and can install applications directly to a memory expansion card.

At step 270 of FIG. 7, the desktop application manager receives a request from a user to install an application program to a portable computer. The procedure continues to step 272 where the desktop application manager determines the storage space available in the built-in memory of the portable computer. At step 274, the desktop application manager identifies any memory expansion cards attached to the portable computer and determines the storage space available on each memory expansion card. An API call such as "GetDiskFreeSpaceEx" returns the available space given a particular directory, such as the name of the memory expansion card. At step 276, the procedure determines whether any storage locations (i.e., built-in memory or a memory expansion card) have sufficient space to receive the requested application. If not, the procedure branches to step 278 and generates a message indicating that the desktop application manager is unable to install the requested application to the portable computer.

If built-in memory or a memory expansion card has sufficient space to receive the requested application, then the procedure continues from step 276 to step 280, which determines whether more than one storage location has sufficient space to install the application. If not (i.e., only one storage location has sufficient space to receive the application), then the procedure branches to step 282 where the application is installed to the storage location that has sufficient space and the procedure terminates. In this situation, where only one storage location has sufficient space to install the application, it is not necessary to prompt the user to select the single storage location. However, in an alternate embodiment, the user may be prompted to confirm installation to the single storage location identified. This prompt allows the user to abort the installation if the storage location is unacceptable to the user.

If more than one storage location has sufficient space to install the application, then the procedure continues from step 280 to step 284, which displays a list of storage locations with sufficient space to the user of the desktop application manager. Additionally, step 284 may display the size of the requested application and the space available in each of the storage locations that can receive the application. Step 284 also prompts the user to select the storage location to receive the application. After the user selects the storage location to receive the application, the procedure continues to step 286, which installs the application to the selected storage location.

The user of the desktop computer may select one of the two procedures discussed above with respect to FIG. 6 and FIG. 7 as the default procedure. For example, the procedure of FIG. 6 may be the default procedure, which requires minimum user interaction with the installation procedure. However, for a particular application installation, the user may desire additional control over the installation process. In that case, the user can override the default procedure such that the desktop computer implements the more interactive procedure described in FIG. 7. Alternatively, the user may set the procedure of FIG. 7 as the default procedure, thereby providing more interaction during each installation.

In one embodiment, the desktop application manager module 106 maintains a list of the location (built-in memory or the address of the memory expansion card) to which each application was last installed. If the user deletes a particular application and later attempts to reinstall the same application to the same portable computer, the desktop application manager module 106 attempts to install the application to the same location that the application was last installed. If the previous installation of the application was to a memory expansion card, the desktop application manager module 106 will first attempt to reinstall the application to the same memory expansion card. If that memory expansion card is no longer installed in the portable computer or if the memory expansion card does not have sufficient memory to receive the application, then the desktop application manager module 106 attempts to install the application to built-in memory or to another memory expansion card. This feature can be activated or deactivated by the user based on the user's installation preferences.

In other embodiments of the invention, the desktop application manager module 106 uses a threshold value to determine whether to install an application to built-in memory or a memory expansion card. If the size of the application exceeds the threshold value, then the desktop application manager module 106 first attempts to install the application to a memory expansion card instead of built-in memory. This use of a threshold value prevents a large application from using a significant portion of built-in memory if, instead, the application is capable of being installed on a memory expansion card.

Thus, as described above, the invention provides a system and method for installing application programs from a base computer to a portable peripheral computer. The invention provides a desktop application manager program, executed on the base computer, to control the installation of an application program to a built-in memory in the portable peripheral computer or to one or more optional memory expansion cards coupled to the portable peripheral computer. The desktop application program manager communicates with the portable peripheral computer using a serial link or other communication mechanism. The desktop application program manager on the base computer interacts with the portable peripheral computer and with a user to determine an appropriate location for installing the application program on the portable peripheral computer. Thus, the invention provides for intelligent decisions regarding program installation, even though the portable computer itself does not have a graphical interface for selecting memory locations.

The direct installation of the application program to the memory expansion card does not require any use of the built-in memory of the portable peripheral computer. Thus, a user can install an application program to a portable peripheral computer without disturbing any of the existing programs or data stored in built-in memory, even if built-in memory is full. Additionally, the invention allows a user to install an application program to a memory expansion card coupled to a portable peripheral computer that does not have a file browser or other mechanism for identifying files (including memory expansion cards that are represented as files) in the portable peripheral computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of installing a computer application program from a base computer to a portable peripheral computer, wherein the portable peripheral computer has limited built-in memory and accepts one or more optional memory expansion units with additional memory, the method comprising:

determining an installed size of the computer application program;

querying the portable peripheral computer from the base computer to determine available memory space in the built-in memory of the portable peripheral computer;

in the base computer, comparing the installed size of the computer application program with the available memory space in the built-in memory of the portable peripheral computer;

if the available storage space is sufficient to accommodate the installed size of the computer application program, then automatically installing the computer application program in the built-in memory of the portable peripheral computer;

if the available storage space is not sufficient to accommodate the installed size of the computer application program, then determining whether an optional memory expansion unit is installed in the portable peripheral computer; and if an optional memory expansion unit is installed in the portable peripheral computer, then installing the computer application program in the additional memory of the optional memory expansion unit.

2. A method as recited in claim 1, wherein the portable peripheral computer is of a type that has limited built-in memory used as both program execution memory and as secondary data storage.

3. A method as recited in claim 1 wherein the base computer is a desktop computer.

4. A method as recited in claim 1 wherein the portable peripheral computer is a palmtop computing device.

5. A method as recited in claim 1 further comprising querying the portable peripheral computer from the base computer to identify all optional memory expansion units installed in the portable peripheral computer.

6. A method as recited in claim 1 further comprising:
querying the portable peripheral computer from the base computer to identify all optional memory expansion units installed in the portable peripheral computer; and
prompting a user of the base computer to select one of the identified optional memory expansion units for installing the computer application program.

7. A method as recited in claim 1 further comprising generating a message at the base computer indicating an unsuccessful installation if (a) the available storage space is not sufficient to accommodate the computer application program and (b) no optional memory expansion units are installed in the portable peripheral computer.

8. A method as recited in claim 1 further comprising recording an installation location of the computer application program at the base computer if the computer application program is successfully installed on the portable peripheral computer.

9. A method as recited in claim 1 further comprising:
recording an installation location of the computer application program at the base computer if the computer application program is successfully installed on the portable peripheral computer; and
installing the application to the recorded installation location during the next installation of the computer application program from the base computer.

10. A method as recited in claim 1 wherein installing the computer application program comprises copying a setup package file from the base computer to the appropriate memory in the portable peripheral computer, wherein the setup package file contains individual files and other information for installing the computer application program on the portable peripheral device.

11. One or more computer-readable memories containing a computer program that is executable by a processor to perform the method recited in claim 1.

12. One or more computer-readable media having stored thereon a computer program comprising the following steps:
identifying a setup package file corresponding to a computer application program to be installed on a portable computer, the portable computer having a limited built-in memory used for both program execution and data storage and a memory expansion unit that can be coupled to the portable computer, wherein the setup package file contains individual files and other information for installing the computer application program on the portable computer;

referencing the setup package file to determine an installed size of the computer application program;

querying the portable computer to determine available memory space in the built-in memory of the portable computer;

comparing the installed size of the computer application program with the available memory space in the built-in memory of the portable computer;

if the available storage space is sufficient to accommodate the installed size of the computer application program, then copying the setup package file to the built-in memory of the portable computer;

if the available storage space is not sufficient to accommodate the installed size of the computer application program, then
querying the portable computer to determine whether an optional memory expansion unit is installed in the portable computer; and
if an optional memory expansion unit is installed in the portable computer, then copying the setup package file to the optional memory expansion unit;

invoking a load module in the portable computer;

wherein the load module installs the computer application program on the portable computer from the setup package file;

wherein the load module installs the computer application program to whatever memory is occupied by the setup package file.

13. One or more computer-readable media as recited in claim 12 further displaying a list of all storage locations in the portable computer that can accommodate the computer application program.

14. One or more computer-readable media as recited in claim 12 further comprising:
displaying a list of all storage locations in the portable computer that can accommodate the computer application program;
requesting selection of a storage location for installation of the computer application program; and
installing the computer application program to the selected storage location in the portable computer.

15. One or more computer-readable media as recited in claim 12 further comprising:
displaying a list of all storage locations in the portable computer that can accommodate the computer application program; and
displaying the available storage space for each storage location in the portable computer that can accommodate the computer application program.

16. One or more computer-readable media as recited in claim 12 further comprising:
identifying all storage locations in the portable computer that can accommodate the computer application program; and if only one storage location can accommodate the computer application program, then installing the computer application program to the storage location in the portable computer that can accommodate the computer application program.

17. One or more computer-readable media as recited in claim 12 further attempting to first install the computer application program to a memory expansion unit if the computer application program size exceeds a threshold value.

18. An apparatus comprising:
   a communications module;
   a storage device that contains a plurality of computer application programs capable of being executed by a portable peripheral computer; and
   a desktop application manager module coupled to the communications module and the storage device, wherein the desktop application manager is configured to determine space available on a built-in memory and any memory expansion cards contained in the portable peripheral computer, and configured to install a computer application program to the built-in memory if the space available on the built-in memory is sufficient to accommodate an installed size of the computer application program, and farther configured to install the computer application program directly to a memory expansion card if the memory expansion card is installed in the portable peripheral computer and the space available on the built-in memory is not sufficient to accommodate the installed size of the computer application program.

19. An apparatus as recited in claim 18 wherein the desktop application manager module is further configured to identify all memory expansion cards in the portable peripheral computer.

20. An apparatus as recited in claim 18 wherein the desktop application manager module is further configured to identify all memory expansion cards in the portable peripheral computer and generate a prompt to select one of the identified memory expansion cards for installing the application.

21. An apparatus as recited in claim 18 wherein the desktop application manager module is further configured to record an installation location of the computer application program on the portable peripheral computer if the application is successfully installed.

22. An apparatus as recited in claim 18 wherein the desktop application manager module is further configured to record an installation location of the computer application program on the portable peripheral computer if the application is successfully installed, and the desktop application manager attempts to install the computer application program to the previous installation location during the next installation of the computer application program.

23. An apparatus as recited in claim 18 wherein the communications module is coupled to the portable peripheral computer through a communication link, and the desktop application manager module installs the computer application program to the portable peripheral computer by downloading the computer application program through the communications module and the communication link to the portable peripheral computer.

24. A method as recited in claim 1 further comprising reinstalling a particular computer application program to the same memory device after the particular application program has been deleted from the portable peripheral computer.

25. A method of installing an application program from a base computer to a portable computer, wherein the portable computer contains built-in memory and accepts a memory expansion unit, the method comprising:
   installing the application program in the built-in memory of the portable computer if the built-in memory has sufficient available storage space to accommodate the installed size of the application program; and
   installing the application program from the base computer directly to the memory expansion unit if the built-in memory does not have sufficient available storage space to accommodate the installed size of the application program and the memory expansion unit is installed in the portable computer and the memory expansion unit has sufficient available space to accommodate the installed size of the application program.

26. A method as recited in claim 25 further comprising querying the portable computer from the base computer to identify all memory expansion units installed in the portable computer.

27. A method as recited in claim 25 further comprising:
   querying the portable computer from the base computer to identify all memory expansion units installed in the portable computer; and
   prompting a user of the base computer to select one of the identified memory expansion units for installing the application program.

28. A method as recited in claim 25 further comprising reinstalling a particular application program to the same memory location after the particular application program has been deleted.

29. One or more computer-readable memories containing a computer program that is executable by a processor to perform the method recited in claim 25.

30. A method of installing an application program from a base computer to a portable computer, wherein the portable computer contains built-in memory and accepts a memory expansion unit, the method comprising:
   determining an installation location for installing the application program in the portable computer, wherein the installation location is selected from the built-in memory of the portable computer and the memory expansion unit;
   installing the application program in the built-in memory of the portable computer if the built-in memory has sufficient available storage space to accommodate the installed size of the application program and the built-in memory is determined to be the installation location; and
   installing the application program in the memory expansion unit if the memory expansion unit has sufficient available storage space to accommodate the installed size of the application program and the memory expansion unit is determined to be the installation location.

31. A method as recited in claim 30 wherein determining an installation location for installing the application program in the portable computer includes determining whether a memory expansion unit is installed in the portable computer.

32. A method as recited in claim 30 wherein determining an installation location for installing the application program in the portable computer includes determining the available storage space in the built-in memory and in the memory expansion unit.

33. A method as recited in claim 30 wherein determining an installation location for installing the application program in the portable computer includes prompting a user of the base computer to select among the built-in memory and the memory expansion unit for installing the application program.

* * * * *

UNITED STATES PATENT AND TRADEMARK OFFICE
CERTIFICATE OF CORRECTION

PATENT NO. : 6,360,364 B1
DATED : March 19, 2002
INVENTOR(S) : Chen et al.

It is certified that error appears in the above-identified patent and that said Letters Patent is hereby corrected as shown below:

<u>Column 7,</u>
Line 23, change "fall-size" to -- full-size --.

<u>Column 15,</u>
Line 25, change "farther" to -- further --.

<u>Column 16,</u>
Line 13, after "available" add -- storage --.

Signed and Sealed this

Twenty-fifth Day of June, 2002

Attest:

Attesting Officer

JAMES E. ROGAN
*Director of the United States Patent and Trademark Office*